US009610973B2

(12) United States Patent
Tagami et al.

(10) Patent No.: US 9,610,973 B2
(45) Date of Patent: Apr. 4, 2017

(54) MOTOR-DRIVEN POWER STEERING APPARATUS

(71) Applicant: Showa Corporation, Gyoda-shi (JP)

(72) Inventors: Kyouichi Tagami, Haga-gun (JP); Katsutoshi Yokoi, Haga-gun (JP); Eishi Ishimaru, Haga-gun (JP); Tadayoshi Iwase, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/078,455

(22) Filed: Mar. 23, 2016

(65) Prior Publication Data

US 2016/0280252 A1 Sep. 29, 2016

(30) Foreign Application Priority Data

Mar. 24, 2015 (JP) .................................. 2015-061106

(51) Int. Cl.
| | |
|---|---|
| *B62D 5/04* | (2006.01) |
| *B62D 3/12* | (2006.01) |
| *B62D 6/10* | (2006.01) |

(52) U.S. Cl.
CPC .............. *B62D 5/046* (2013.01); *B62D 3/12* (2013.01); *B62D 5/0421* (2013.01); *B62D 5/0472* (2013.01); *B62D 6/10* (2013.01)

(58) Field of Classification Search
CPC ........ B62D 5/046; B62D 6/10; B62D 5/0421; B62D 3/12; B62D 5/0472
See application file for complete search history.

(56) References Cited

U.S. PATENT DOCUMENTS

| | | |
|---|---|---|
| 2009/0000857 A1 | 1/2009 | Sugiyama et al. |
| 2010/0324784 A1 | 12/2010 | Yu |

(Continued)

FOREIGN PATENT DOCUMENTS

| | | |
|---|---|---|
| JP | 2001-315657 A | 11/2001 |
| JP | 2009051278 A * | 3/2009 |

(Continued)

OTHER PUBLICATIONS

Extended European Search Report mailed Aug. 22, 2016 for the corresponding European Patent Application No. 16162148.7.

*Primary Examiner* — Rodney Butler
(74) *Attorney, Agent, or Firm* — Leason Ellis LLP

(57) ABSTRACT

A motor-driven power steering apparatus including: a base current calculator configured to calculate a base current, which is a base for a target current, based on a detected torque detected by a torque sensor; a band-pass filter configured to allow a predetermined range of frequency components of the detected torque to the pass through the band-pass filter; a base shimmy compensation current calculator configured to calculate a base shimmy compensation current, considered a base for a shimmy compensation current required to suppress a disturbance torque, based on an extracted torque after passing through the band-pass filter; a shimmy compensation current calculator configured to calculate the shimmy compensation current by correcting the base shimmy compensation current according to magnitude of amplitude of the extracted torque; and a final target current determination unit configured to determine the target current based on the base current and the shimmy compensation current.

9 Claims, 13 Drawing Sheets

(56) References Cited

U.S. PATENT DOCUMENTS

2012/0185132 A1    7/2012  Kezobo et al.
2012/0271513 A1*  10/2012  Yoneda ................ B62D 5/0493
    701/41
2013/0075191 A1*  3/2013  Iwase ................... B62D 5/0463
    180/446

FOREIGN PATENT DOCUMENTS

| | | |
|---|---|---|
| JP | 2011-121383 A | 6/2011 |
| JP | 2015-143074 A | 8/2015 |
| JP | 2015-178286 A | 10/2015 |
| JP | 2016-068676 A | 5/2016 |
| JP | 2016-068677 A | 5/2016 |

\* cited by examiner

MOTOR-DRIVEN POWER STEERING APPARATUS

CROSS-REFERENCE TO RELATED APPLICATIONS

This application claims the benefit of Japanese Patent Application JP 2015-061106, filed Mar. 24, 2015, the entire content of which is hereby incorporated by reference, the same as if set forth at length.

BACKGROUND OF THE INVENTION

1. Field of the Invention

The present invention relates to a motor-driven power steering apparatus.

2. Description of Related Art

In recent years, a motor-driven power steering apparatus, which includes an electric motor in the steering system of a vehicle and in which drive power of the electric motor is added to steering force applied by a driver, has been proposed.

For example, a motor-driven power steering apparatus disclosed in JP-A-2001-315657 is controlled by a control apparatus. First, according to steering torque, vehicle speed, or the like, the control apparatus sets a target current to be supplied to the electric motor so as to control the driving of the electric motor. The control apparatus performs feedback control to set the deviation between the target current and the actual current to zero, and thus to make the set target current coincide with the actual current actually flowing through the electric motor.

The roughness of a road, the misalignment of a wheel, or the like may cause the occurrence of a shimmy phenomenon, which is a concern. Since rotational vibration of a steering wheel is transmitted to a driver during the occurrence of the shimmy phenomenon, the vibration of the steering wheel caused by the shimmy phenomenon is desirably suppressed. For this reason, the electric motor is deemed to apply assistance force to suppress vibration caused by the shimmy phenomenon. When assistance force is applied to suppress vibration other than the vibration caused by the shimmy phenomenon, steering feeling may be deteriorated, which is a concern.

SUMMARY OF THE INVENTION

An object of the present invention is to provide a motor-driven power steering apparatus capable of suppressing the vibration of a steering wheel caused by a shimmy phenomenon, and suppressing deterioration of steering feeling when vibration caused by the shimmy phenomenon does not occur.

According to an aspect of the present invention, there is provided a motor-driven power steering apparatus including: a steering shaft configured to be rotated in connection with a steering wheel of a vehicle; a pinion shaft configured to apply driving force to a rack shaft by rotating with respect to the rack shaft turning a turning wheel; a detector configured to detect a torque between the steering shaft and the pinion shaft; an electric motor configured to apply driving force to the rack shaft; a base current calculator configured to calculate a base current, which is a base for a target current to be supplied to the electric motor, based on a detected torque detected by the detector; a band-pass filter configured to allow a predetermined range of frequency components of the detected torque detected by the detector to pass through the band-pass filter; a base suppression current calculator configured to calculate a base suppression current, which is a base for a suppression current required to suppress a disturbance torque transmitted from the turning wheel to the steering wheel, based on a passing torque which is the detected torque after passing through the band-pass filter; a suppression current calculator configured to calculate the suppression current by correcting the base suppression current, which is calculated by the base suppression current calculator, according to magnitude of amplitude of the passing torque; and a target current determiner configured to determine the target current based on the base current calculated by the base current calculating calculator and the suppression current calculated by the suppression current calculator.

In the aspect, the suppression current calculator may perform the correcting such that the suppression current is set to be lower when the magnitude of amplitude of the passing torque is less than a predetermined value compared to when the magnitude of the amplitude is greater than the predetermined value.

In the aspect, the base suppression current calculator may calculate the base suppression current based on a change amount having a reverse phase with respect to the passing torque.

In the aspect, the band-pass filter may be a filter that allows the passing through of the predetermined range of frequency components centered around a center frequency, and the motor-driven power steering apparatus may further include a changer configured to change the center frequency based on a vehicle speed which is a moving speed of the vehicle.

In the aspect, the motor-driven power steering apparatus may further include a corrector configured to correct a change amount having a reverse phase with respect to the passing torque based on a vehicle speed which is a moving speed of the vehicle. The base suppression current calculator may calculate the base suppression current based on the change amount corrected by the corrector.

According to the present invention, it is possible to suppress vibration of a steering wheel caused by a shimmy phenomenon, and to suppress deterioration of steering feeling when vibration caused by the shimmy phenomenon does not occur.

DESCRIPTION OF EMBODIMENTS

Hereinafter, an embodiment of the present invention will be described in detail with reference to the accompanying drawings.

Figure 1:
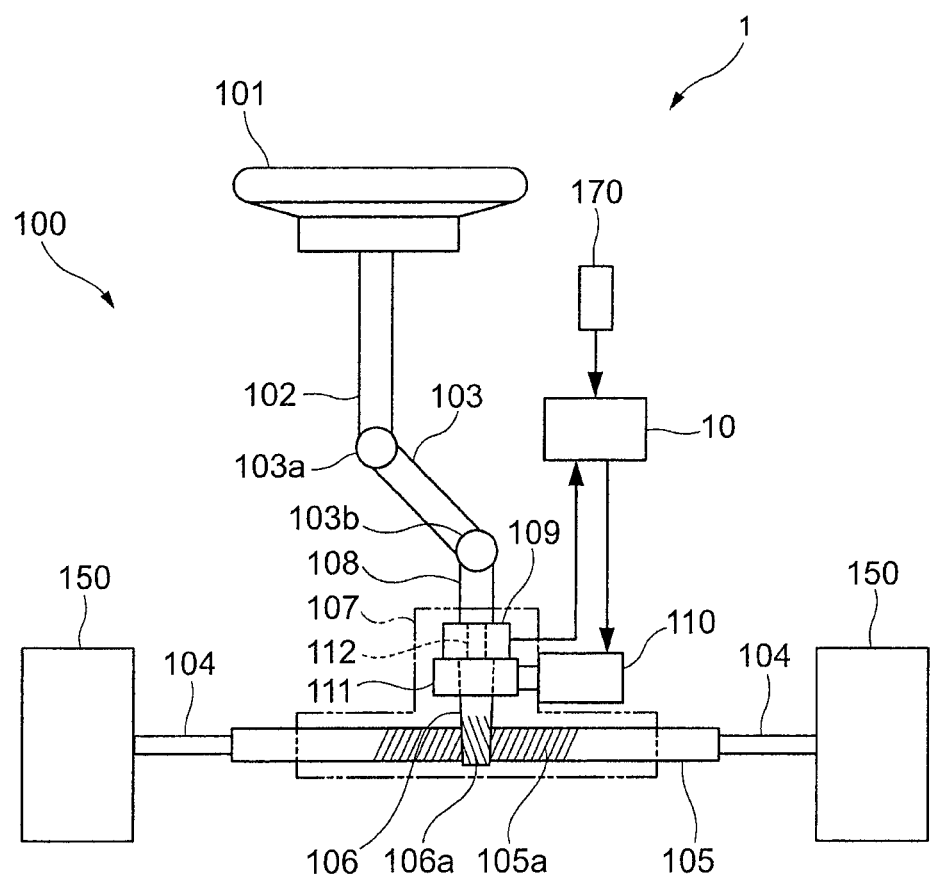
FIG. 1 is a schematic view illustrating the configuration of a motor-driven power steering apparatus in an embodiment.

FIG. 1 is a schematic view illustrating the configuration of a motor-driven power steering apparatus 100 in the embodiment.

The motor-driven power steering apparatus 100 (hereinafter, may also be simply referred to as a "steering apparatus 100") is a steering apparatus for changing the forward-moving direction of a vehicle to an arbitrary direction. The embodiment exemplarily describes the configuration of the motor-driven power steering apparatus 100 applied to an automobile 1 as an example of the vehicle.

The steering apparatus 100 includes a wheel-shaped steering wheel 101 operated by a driver to change the forward-moving direction of the automobile 1, and a steering shaft 102 provided integrally with the steering wheel 101. The steering apparatus 100 includes an upper connecting shaft 103 connected to the steering shaft 102 via a universal coupling 103a, and a lower connecting shaft 108 connected to the upper connecting shaft 103 via a universal coupling 103b. The lower connecting shaft 108 is rotated along with the rotation of the steering wheel 101.

The steering apparatus 100 includes tie rods 104 respectively connected to right and left front wheels 150 as turning wheels, and a rack shaft 105 connected to the tie rods 104. The steering apparatus 100 includes a pinion 106a that forms a rack and pinion mechanism together with rack teeth 105a formed on the rack shaft 105. The pinion 106a is formed in a lower end portion of a pinion shaft 106. The rack shaft 105, the pinion shaft 106, and the like serve as a transmission mechanism by which driving force to rotate the steering wheel 101 is transmitted as turning force of the front wheels 150. The pinion shaft 106 applies driving force to the rack shaft 105 to turn the front wheels 150 by rotating with respect to the rack shaft 105 turning the front wheels 150.

The steering apparatus 100 includes a steering gear box 107 accommodating the pinion shaft 106. The pinion shaft 106 is connected to the lower connecting shaft 108 via a torsion bar 112 in the steering gear box 107. A torque sensor 109 is provided in the steering gear box 107, and is an example of the detector configured to detect a steering torque applied to the steering wheel 101 and/or a disturbance torque transmitted to the pinion shaft 106 via the front wheels 150 based on the relative rotational angle between the lower connecting shaft 108 and the pinion shaft 106, in other words, based on the amount of twist of the torsion bar 112. In other words, the torque sensor 109 detects a torque applied to the torsion bar 112. The torque sensor 109 detects a torque between the steering shaft 102 and the pinion shaft 106.

The steering apparatus 100 includes an electric motor 110 supported by the steering gear box 107, and a speed reduction mechanism 111 that reduces driving force of the electric motor 110, and transmits the resultant force to the pinion shaft 106. The speed reduction mechanism 111 is configured to include a worm wheel (not illustrated) fixed to the pinion shaft 106, a worm gear (not illustrated) fixed to an output shaft of the electric motor 110, and the like. The electric motor 110 applies force to drive the rotation of the pinion shaft 106, and thus applies driving force to the rack shaft 105 to turn the front wheels 150. A 3-phase brushless motor may be exemplified as the electric motor 110 in the embodiment.

The steering apparatus 100 includes a control apparatus 10 controlling the operation of the electric motor 110. The control apparatus 10 receives output signals from the torque sensor 109. The control apparatus 10 receives output signals from a vehicle speed sensor 170 detecting a vehicle speed (moving speed of an automobile) Vc, and the like via a network (CAN) by which signals for controlling various devices mounted in the automobile are communicated.

The steering apparatus 100 with such a configuration drives the electric motor 110 based on a detected torque obtained by the torque sensor 109, and transmits generated torque of the electric motor 110 to the pinion shaft 106. Accordingly, the generated torque of the electric motor 110 is added to steering force applied to the steering wheel 101 by a driver.

Hereinafter, the control apparatus 10 will be described.

Figure 2:
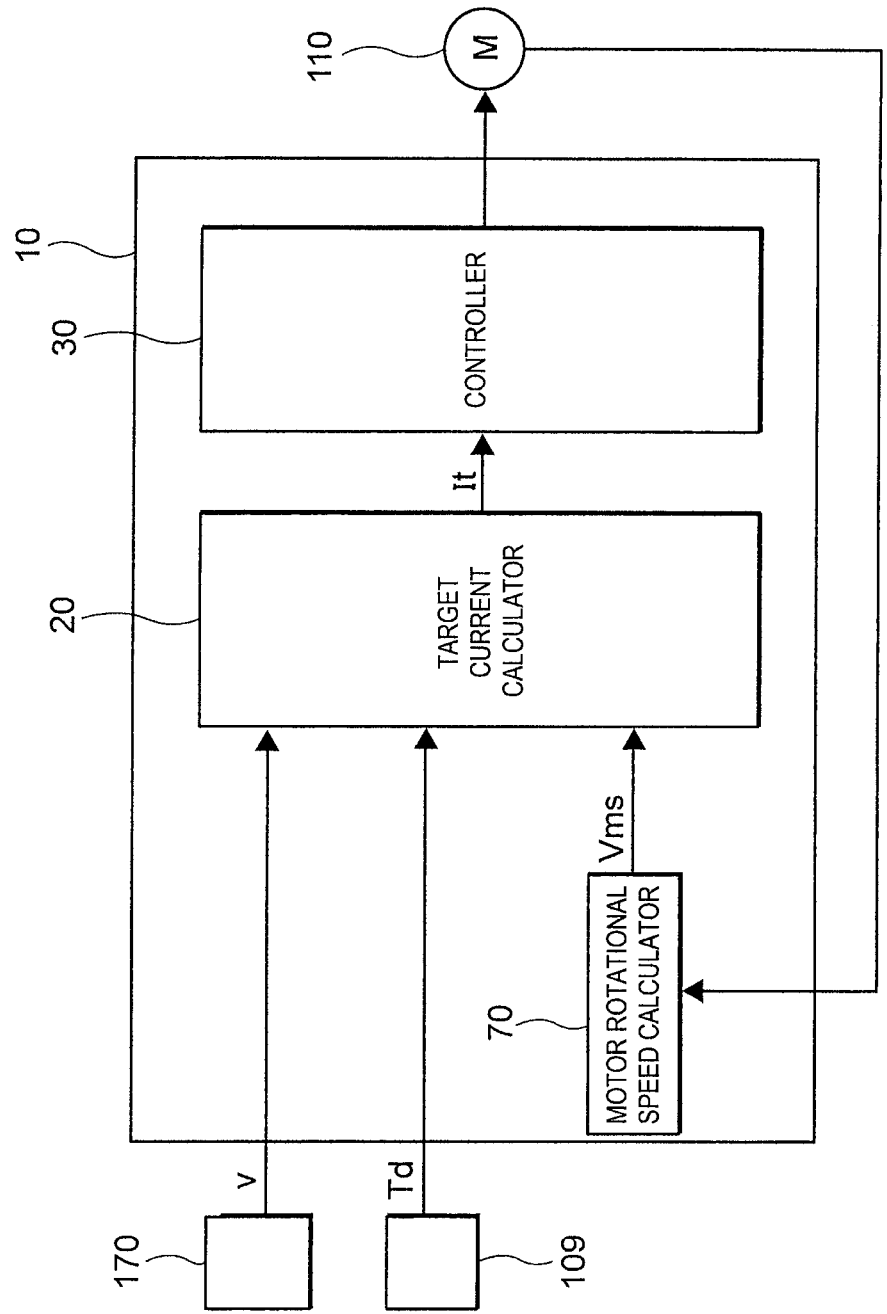
FIG. 2 is a schematic block diagram illustrating the configuration of a control apparatus.

FIG. 2 is a schematic block diagram of the control apparatus 10.

The control apparatus 10 is an arithmetic and logic circuit configured to include a CPU, a ROM, a RAM, a back-up RAM, and the like.

The control apparatus 10 receives a torque signal Td which is an output signal converted from a detected torque T detected by the torque sensor 109; a vehicle speed signal v which is an output signal converted from the vehicle speed Vc detected by the vehicle speed sensor 170; and the like.

The control apparatus 10 includes a target current calculator 20 calculating (setting) a target current It to be supplied to the electric motor 110 based on the torque signal Td and the vehicle speed signal v, and a controller 30 performing feedback control and the like based on the target current It calculated by the target current calculator 20.

The control apparatus 10 includes a motor rotational speed calculator 70 calculating a rotational speed Vm of the electric motor 110. The motor rotational speed calculator 70 calculates the rotational speed Vm of the electric motor 110 based on an output signal from a resolver detecting the rotational position of a rotor of the electric motor 110 which is a 3-phase brushless motor. The motor rotational speed calculator 70 outputs a rotational speed signal Vms which is an output signal converted from the rotational speed Vm of the electric motor 110.

Hereinafter, the target current calculator 20 will be described.

Figure 3:
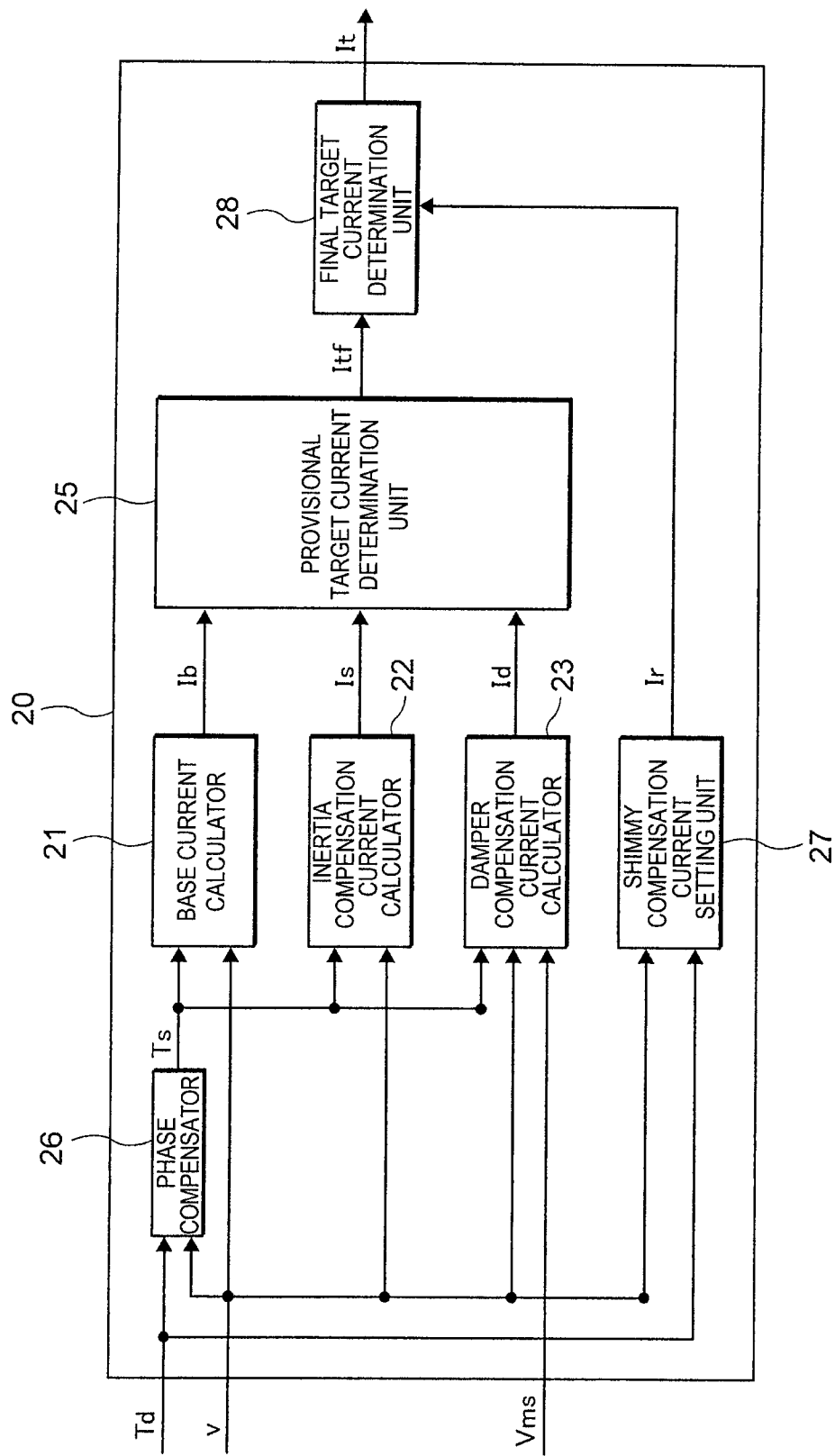
FIG. 3 is a schematic block diagram illustrating the configuration of a target current calculator.

FIG. 3 is a schematic block diagram of the target current calculator 20.

The target current calculator 20 includes a base current calculator 21 as an example of the base current calculating calculator configured to calculate a base current Ib which is a base for setting the target current It; an inertia compensation current calculator 22 calculating an inertial compensation current Is required to overcome the moment of inertia of the electric motor 110; and a damper compensation current calculator 23 calculating a damper compensation current Id required to limit the rotation of the electric motor 110.

The target current calculator 20 includes a provisional target current determination unit 25 determining a provisional target current Itf based on the values calculated by the base current calculator 21, the inertia compensation current calculator 22, and the damper compensation current calculator 23. The target current calculator 20 includes a phase compensator 26 which compensates the phase of the detected torque T detected by the torque sensor 109.

The target current calculator 20 includes a shimmy compensation current setting unit 27 setting a shimmy compensation current Ir as an example of a suppression current which is current required to suppress rotational vibration of the steering wheel 101 caused by a shimmy phenomenon. The target current calculator 20 includes a final target current determination unit 28 as an example of the target current determiner configured to finally determine the target current It based on the provisional target current Itf determined by the provisional target current determination unit 25, and the shimmy compensation current Ir set by the shimmy compensation current setting unit 27.

The target current calculator 20 receives the torque signal Td, the vehicle speed signal v, the rotational speed signal Vms, and the like.

Figure 4:
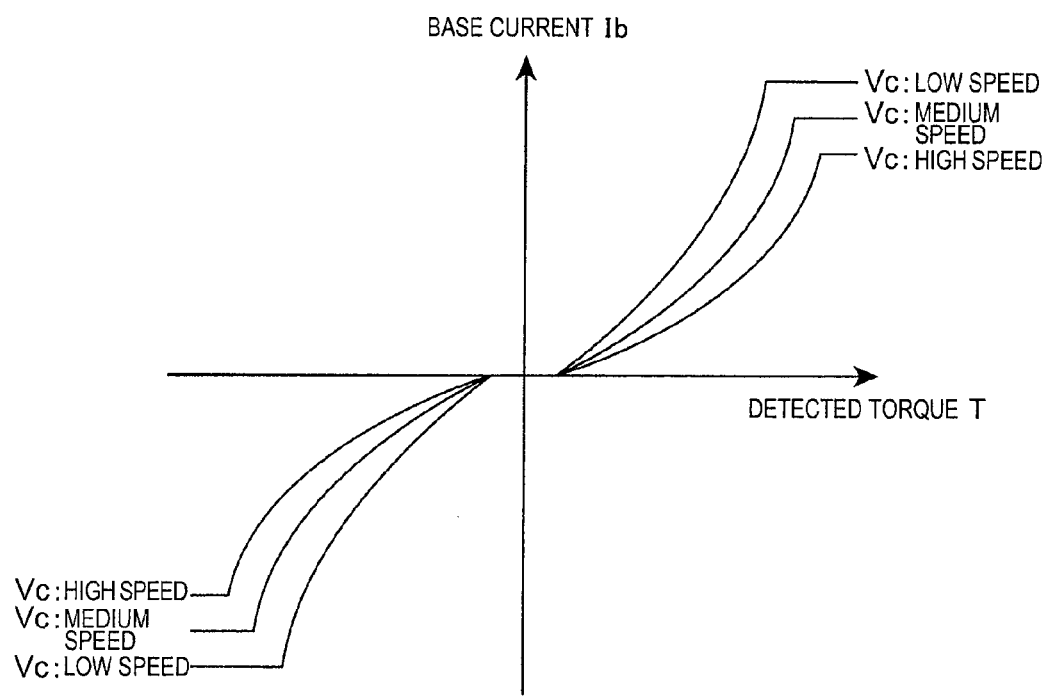
FIG. 4 is a schematic control map illustrating a correlation between a detected torque, a vehicle speed, and a base current.

FIG. 4 is a schematic control map illustrating a correlation between the detected torque T, the vehicle speed Vc, and the base current Ib.

The base current calculator 21 calculates the base current Ib based on a torque signal Ts obtained by compensating the phase of the torque signal Td using the phase compensator 26, and the vehicle speed signal v from the vehicle speed sensor 170. That is, the base current calculator 21 calculates the base current Ib according to the phase-compensated detected torque T and the vehicle speed Vc. For example, the control map exemplarily illustrating the correlation between the phase-compensated detected torque T (the torque signal Ts), the vehicle speed Vc (the vehicle speed signal v), and the base current Ib in FIG. 4 is prepared based on an approximation, and stored in the ROM in advance. The base current calculator 21 calculates the base current Ib by substituting the detected torque T (the torque signal Ts) and the vehicle speed Vc (the vehicle speed signal v) into this control map.

The inertia compensation current calculator 22 calculates the inertia compensation current Is required to overcome the moment of inertia of the electric motor 110 and the system, based on the torque signal Ts and the vehicle speed signal v. That is, the inertia compensation current calculator 22 calculates the inertial compensation current Is according to the detected torque T (the torque signal Ts) and the vehicle speed Vc (the vehicle speed signal v). For example, a control map illustrating a correlation between the detected torque T (the torque signal Ts), the vehicle speed Vc (the vehicle speed signal v), and the inertia compensation current Is is prepared based on an approximation, and stored in the ROM in advance. The inertia compensation current calculator 22 calculates the inertia compensation current Is by substituting the detected torque T (the torque signal Ts) and the vehicle speed Vc (the vehicle speed signal v) into this control map.

The damper compensation current calculator 23 calculates the damper compensation current Id required to limit the rotation of the electric motor 110, based on the torque signal Ts, the vehicle speed signal v, and the rotational speed signal Vms of the electric motor 110. That is, the damper compensation current calculator 23 calculates the damper compensation current Id according to the detected torque T (the torque signal Ts), the vehicle speed Vc (the vehicle speed signal v), and the rotational speed Vm (the the rotational speed signal Vms) of the electric motor 110. For example, a control map illustrating a correlation between the detected torque T (the torque signal Ts), the vehicle speed Vc (the vehicle speed signal v), the rotational speed Vm (the rotational speed signal Vms), and the damper compensation current Id is prepared based on an approximation, and stored in the ROM in advance. The damper compensation current calculator 23 calculates the damper compensation current Id by substituting the detected torque T (the torque signal Ts), the vehicle speed Vc (the vehicle speed signal v), and the rotational speed Vm (the rotational speed signal Vms) into this control map.

The provisional target current determination unit 25 calculates the provisional target current Itf based on the base current Ib calculated by the base current calculator 21, the inertia compensation current Is calculated by the inertia compensation current calculator 22, and the damper compensation current Id calculated by the damper compensation current calculator 23. The provisional target current determination unit 25 determines the provisional target current Itf by adding the inertia compensation current Is to the base current Ib and subtracting the damper compensation current Id from the base current Ib.

The shimmy compensation current setting unit 27 will be described later.

The final target current determination unit 28 finally determines the target current It based on the provisional target current Itf determined by the provisional target current determination unit 25, and the shimmy compensation current Ir set by the shimmy compensation current setting unit 27. The final target current determination unit 28 in the embodiment determines the target current It by adding the shimmy compensation current Ir (set by the shimmy compensation current setting unit 27) to the provisional target current Itf determined by the provisional target current determination unit 25.

Hereinafter, the controller 30 will be described.

Figure 5:
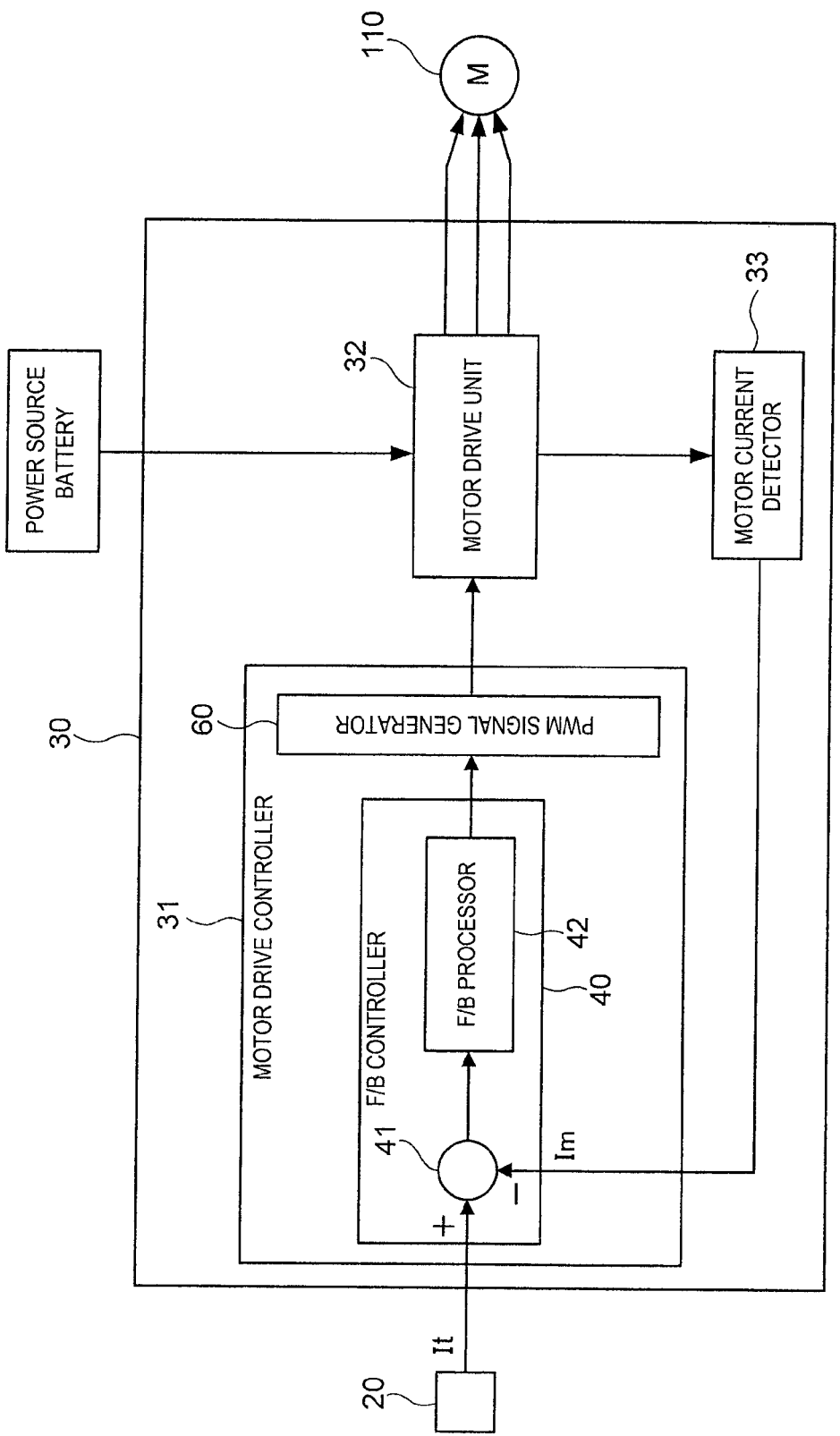
FIG. 5 is a schematic block diagram illustrating the configuration of a controller.

FIG. 5 is a schematic block diagram of the controller 30.

As illustrated in FIG. 5, the controller 30 includes a motor drive controller 31 controlling the operation of the electric motor 110; a motor drive unit 32 driving the electric motor 110; and a motor current detector 33 detecting an actual current Im that actually flows through the electric motor 110.

The motor drive controller 31 includes a feedback (F/B) controller 40 performing feedback control based on the deviation between the target current It finally determined by the target current calculator 20 and the actual current Im which is supplied to the electric motor 110 and detected by the motor current detector 33, and a PWM signal generator 60 generating a pulse width modulation (PWM) signal for driving the electric motor 110 in a PWM manner.

The feedback controller 40 includes a deviation calculator 41 obtaining the deviation between the target current It finally determined by the target current calculator 20 and the actual current Im detected by the motor current detector 33, and a feedback (F/B) processor 42 performing a feedback process to set the deviation to zero.

The feedback (F/B) processor 42 performs feedback control to make the target current It coincide with the actual current Im. For example, the feedback processor 42 proportionally and integrally processes the deviation (calculated by the deviation calculator 41) using a proportional element and an integral element, respectively, and adds the resultant values together using an addition calculator.

The PWM signal generator 60 generates a PWM signal required to drive the electric motor 110 in a PWM manner, based on an output value from the feedback controller 40, and outputs the generated PWM signal.

The motor drive unit 32 is a so-called inverter. For example, the motor drive unit 32 includes six independent transistors (FETs) as switching elements, three transistors among the six transistors are respectively connected between a positive-polarity line of a power source and three phase electric coils, and the other three transistors are respectively connected between a negative-polarity (ground) line of the power source and the three phase electric coils. The motor drive unit 32 drives the gates of two transistors selected from the six transistors so as to switch the two transistors on and off, and thus to control the driving of the electric motor 110.

The motor current detector 33 detects the value of the actual current Im (flowing through the electric motor 110) from a voltage applied to both ends of a shunt resistor connected to the motor drive unit 32.

Hereinafter, the shimmy compensation current setting unit 27 will be described.

Upon the occurrence of the shimmy phenomenon, vibration is transmitted from the front wheels 150 to the steering wheel 101 via the rack shaft 105, the pinion shaft 106, the steering shaft 102, and the like.

The shimmy compensation current setting unit 27 sets the shimmy compensation current Ir required by the electric motor 110 to cancel vibration that is transmitted to the steering wheel 101 due to the shimmy phenomenon. That is, the shimmy compensation current Ir is required to drive the electric motor 110 such that rotational torque is applied to the pinion shaft 106 reversely to rotational torque that is transmitted to the pinion shaft 106 via the front wheels 150, the rack shaft 105, and the like due to the shimmy phenomenon.

Figure 6:
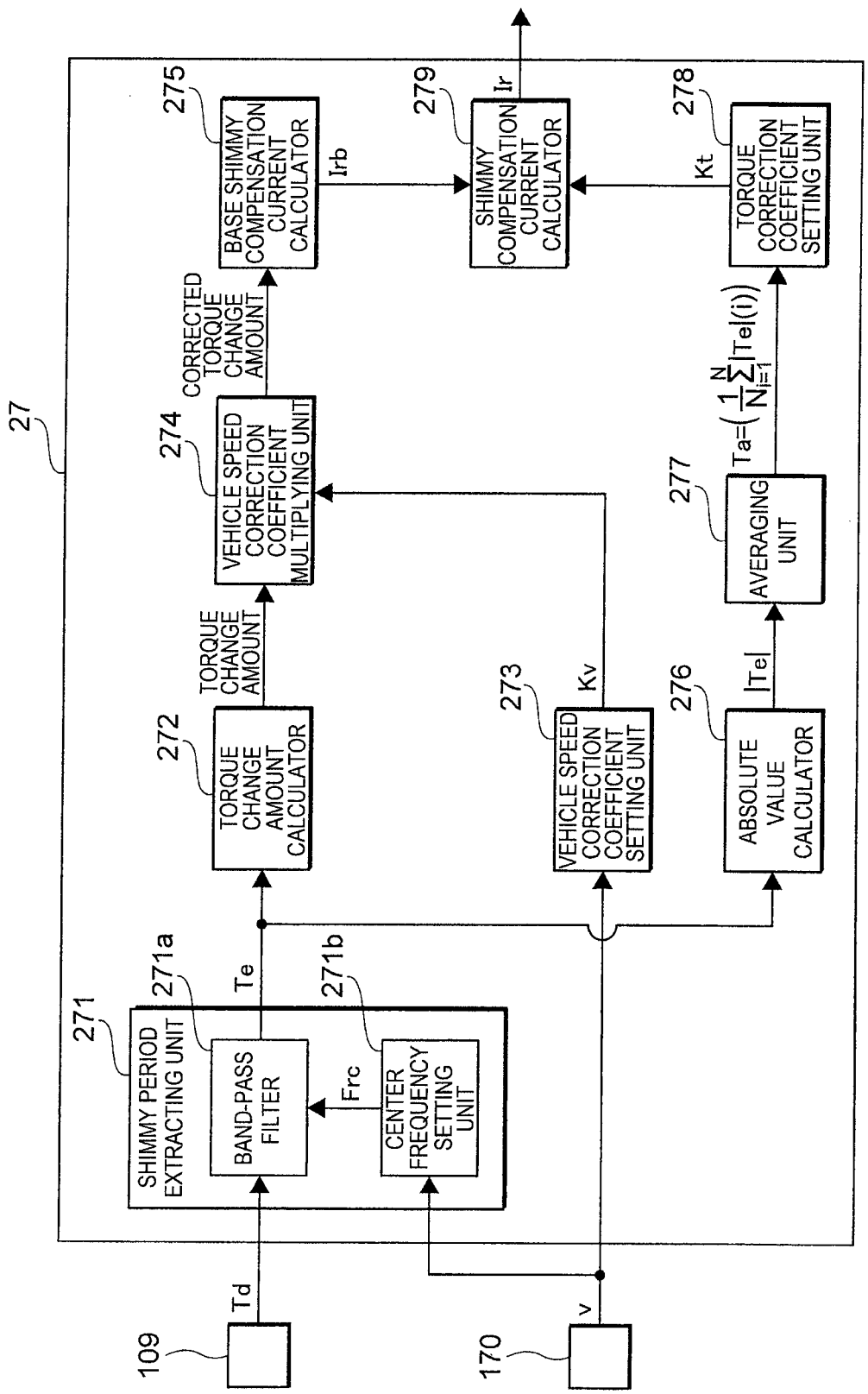
FIG. 6 is a schematic block diagram illustrating the configuration of a shimmy compensation current setting unit.

FIG. 6 is a schematic block diagram of the shimmy compensation current setting unit 27.

The shimmy compensation current setting unit 27 includes a shimmy period extracting unit 271 extracting the detected torque T (detected by the torque sensor 109) having predetermined frequency bandwidth components, and a torque change amount calculator 272 calculating a torque change amount having a reverse phase with respect to an extracted torque Te which is the detected torque T extracted by the shimmy period extracting unit 271.

The shimmy compensation current setting unit 27 includes a vehicle speed correction coefficient setting unit 273 setting a vehicle speed correction coefficient Kv based on the vehicle speed signal v, and a vehicle speed correction coefficient multiplying unit 274 calculating a torque change amount after correction by multiplying the torque change amount (calculated by the torque change amount calculator 272) by the vehicle speed correction coefficient Kv set by the vehicle speed correction coefficient setting unit 273.

The shimmy compensation current setting unit 27 includes a base shimmy compensation current calculator 275 that calculates a base shimmy compensation current Irb, which is a base for the shimmy compensation current Ir, based on the torque change amount after correction calculated by the vehicle speed correction coefficient multiplying unit 274.

The shimmy compensation current setting unit 27 includes an absolute value calculator 276 calculating the absolute value of the extracted torque Te extracted by the shimmy period extracting unit 271, and an averaging unit 277 averaging an extracted absolute torque |Te| calculated by the absolute value calculator 276.

The shimmy compensation current setting unit 27 includes a torque correction coefficient setting unit 278 setting a torque correction coefficient Kt for correcting the base shimmy compensation current Irb (calculated by the base shimmy compensation current calculator 275) based on average torque Ta obtained from averaging by the averaging unit 277.

The shimmy compensation current setting unit 27 includes a shimmy compensation current calculator 279 calculating the shimmy compensation current Ir by multiplying the base shimmy compensation current Irb (calculated by the base shimmy compensation current calculator 275) by the torque correction coefficient Kt set by the torque correction coefficient setting unit 278.

The shimmy period extracting unit 271 includes a band-pass filter 271a that allows the passing through of only signals within a predetermined frequency bandwidth centered around a center frequency Frc in the torque signal Td from the torque sensor 109, but does not allow the passing through (dampening) of signals having other frequencies, and a center frequency setting unit 271b setting the center frequency Frc of the band-pass filter 271a according to the vehicle speed Vc.

Figure 7:
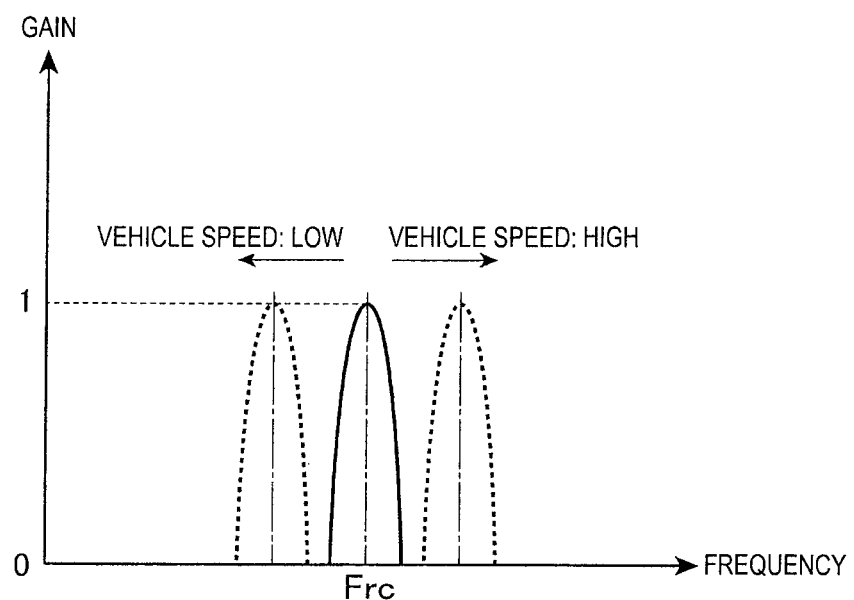
FIG. 7 is a graph schematically illustrating a band-pass filter.

FIG. 7 is a graph schematically illustrating the band-pass filter 271a. In FIG. 7, the horizontal axis represents a frequency, and the vertical axis represents a gain.

The band-pass filter 271a is a filter serving to allow the passing through of only signals within the predetermined frequency bandwidth (for example, 3 Hz) centered around the center frequency Frc, but does not allow the passing through (dampening) of signals having other frequencies. The band-pass filter 271a can be configured by a program (software) executed by an analog circuit, a CPU, or the like. The center frequency Frc is set by the center frequency setting unit 271b.

Figure 8:
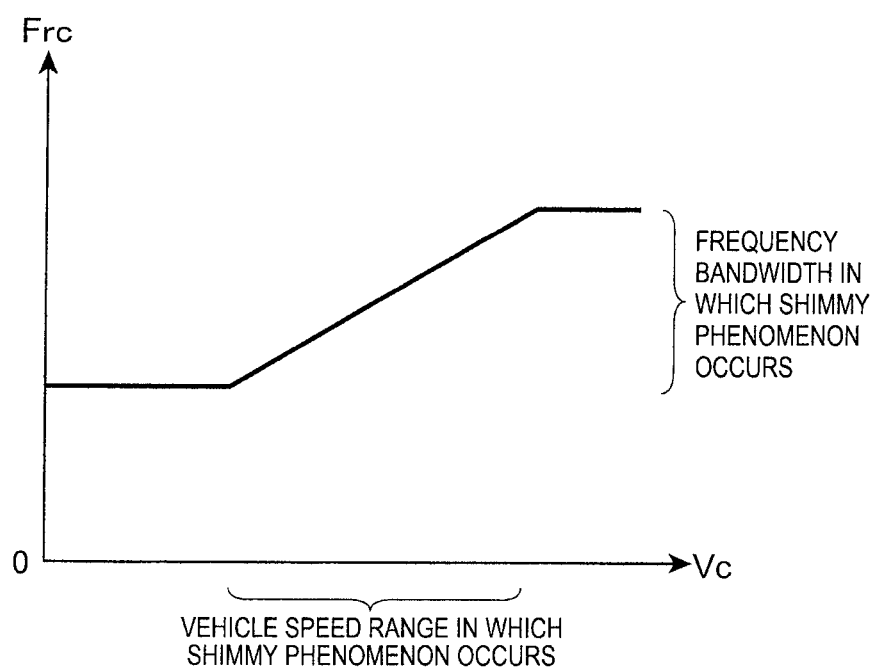
FIG. 8 is a schematic control map illustrating a correlation between the vehicle speed and the center frequency of the band-pass filter.

FIG. 8 is a schematic control map illustrating a correlation between the vehicle speed Vc and the center frequency Frc of the band-pass filter 271a.

The center frequency setting unit 271b determines the center frequency Frc of the band-pass filter 271a based on the vehicle speed signal v. That is, the center frequency setting unit 271b calculates the center frequency Frc according to the vehicle speed Vc. The control map exemplarily illustrating the correlation between the vehicle speed Vc (the vehicle speed signal v) and the center frequency Frc in FIG. 8 is prepared based on an approximation, and stored in the ROM in advance. The center frequency setting unit 271b calculates the center frequency Frc by substituting the vehicle speed Vc (the vehicle speed signal v) into this control map. As such, the center frequency setting unit 271b serves as an example of the changer configured to change the center frequency Frc based on the vehicle speed Vc.

Since one period of vibration caused by the shimmy phenomenon is deemed to be one rotation of the front wheel 150, the frequency of this vibration is dependent on the rotational speed of the front wheel 150, and increases in proportion to the rotational speed of the front wheel 150. The diameters of the front wheel 150 may be different depending on the vehicle type. The diameters of the front wheel 150 may be different even for the same vehicle type depending on the vehicle options. In contrast, it is deemed that the rotational speeds of the front wheel 150 causing the occurrence of the shimmy phenomenon are different depending on the vehicle types or the vehicle options, but typically, the shimmy phenomenon occurs at a predetermined range of rotational speed. For this reason, the shimmy phenomenon occurs at a low vehicle speed Vc in a vehicle with large-diameter front wheels 150, and the frequency of vibration caused by the shimmy phenomenon is low. In contrast, the shimmy phenomenon occurs at a high vehicle speed Vc in a vehicle with small-diameter front wheels 150, and the frequency of vibration caused by the shimmy phenomenon is high. Typically, the frequency of vibration caused by the shimmy phenomenon is deemed to lie between 10 Hz and 20 Hz.

As shown in the control map illustrating the correlation between the vehicle speed Vc and the center frequency Frc of the band-pass filter 271a in FIG. 8, in light of these factors, the vehicle speed Vc and the center frequency Frc are set to have a proportional relationship in a vehicle speed range in which the shimmy phenomenon is deemed to occur. The center frequency Frc in a vehicle speed range, which is lower than the vehicle speed range in which the shimmy phenomenon is deemed to occur, is set to the center frequency Frc at the minimum vehicle speed in the vehicle speed range in which the shimmy phenomenon is deemed to occur. The center frequency Frc in a vehicle speed range, which is higher than the vehicle speed range in which the shimmy phenomenon is deemed to occur, is set to the center frequency Frc at the maximum vehicle speed in the vehicle speed range in which the shimmy phenomenon is deemed to occur.

For example, in a vehicle to which the steering apparatus 100 in the embodiment is assembled, the center frequency setting unit 271b calculates the center frequency Frc by acquiring the vehicle speed Vc at which vibration caused by the shimmy phenomenon occurs, and substituting the acquired vehicle speed Vc in the control map exemplarily illustrated in FIG. 8. The center frequency setting unit 271b sets the calculated center frequency Frc as the center frequency Frc of the band-pass filter 271a. For example, the center frequency setting unit 271b is capable of acquiring identification information regarding the vehicle, and reading and acquiring the vehicle speed Vc, at which vibration caused by the shimmy phenomenon occurs and which corresponds to the acquired identification information, from the ROM. As an example, the center frequency setting unit 271b is capable of acquiring the vehicle speed Vc, at which vibration caused by the shimmy phenomenon occurs, based on a value input by an operator who sets the steering apparatus 100.

The shimmy period extracting unit 271 with the aforementioned configuration allows the passing through of only signals within the predetermined frequency bandwidth centered around the center frequency Frc (set by the center frequency setting unit 271b) in the torque signal Td from the torque sensor 109, and thus the shimmy period extracting unit 271 highly precisely extracts signals having the frequency of vibration caused by the shimmy phenomenon.

The shimmy period extracting unit 271 may extract the frequency components of vibration caused by the shimmy phenomenon from the detected torque T by performing a computational process. For example, the shimmy period extracting unit 271 may read the detected torque T from the torque sensor 109, and extract the predetermined frequency bandwidth components every predetermined time interval (for example, 4 milliseconds).

The torque change amount calculator 272 computes a torque change amount having a reverse phase with respect to the detected torque T extracted by the shimmy period extracting unit 271. For example, the torque change amount calculator 272 performs a computational process for computing the 2nd-order differential value of the detected torque T (extracted by the shimmy period extracting unit 271), and computes reverse phase components of the specific frequency components (extracted by the shimmy period extracting unit 271) as a torque change amount having the reverse phase with respect to the detected torque T. The reverse phase components may be computed by differentiating and compensating the phase of the detected torque T extracted by the shimmy period extracting unit 271.

Figure 9:
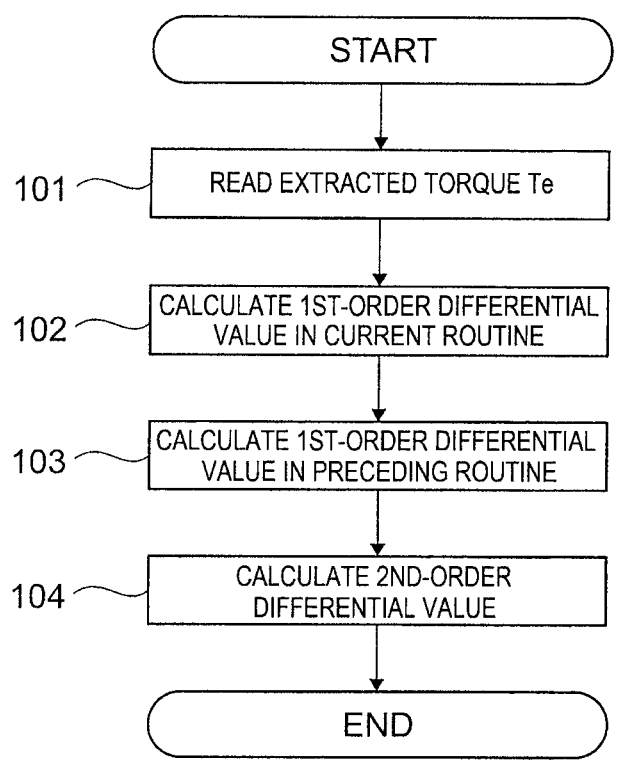
FIG. 9 is a flowchart illustrating a computational process performed by a torque change amount computation processor.

FIG. 9 is a flowchart illustrating the computational process performed by the torque change amount calculator 272.

The torque change amount calculator 272 repeatedly executes the computational process illustrated in FIG. 9 every predetermined time interval (for example, 4 milliseconds).

With reference to FIG. 9, the torque change amount calculator 272 reads the extracted torque Te which is the detected torque T extracted by the shimmy period extracting unit 271 (step S101). The torque change amount calculator 272 calculates the 1st-order differential value (the changing speed of the extracted torque Te) (hereinafter, referred to as a "current 1st-order differential value") of the extracted torque Te from a first preceding routine to a current routine based on the extracted torque Te read in the current routine and the extracted torque Te read in the first preceding routine (step S102). Thereafter, the torque change amount calculator 272 calculates the 1st-order differential value (the changing speed of the extracted torque Te) (hereinafter, referred to as a "first preceding 1st-order differential value") of the extracted torque Te from a second preceding routine to the first preceding routine based on the extracted torque Te read in the first preceding routine and the extracted torque Te read in the second preceding routine (step S103). Thereafter, the torque change amount calculator 272 calculates the 2nd-order differential value (the changing acceleration of the extracted torque Te) (torque change amount having a reverse phase with respect to the extracted torque Te) of the extracted torque Te based on the current 1st-order differential value calculated in step S102 and the first preceding 1st-order differential value calculated in step S103 (step S104).

The 1st-order differential value of the extracted torque Te calculated in the first preceding routine of step S102 may be used in the current routine of step S103.

Figure 10:
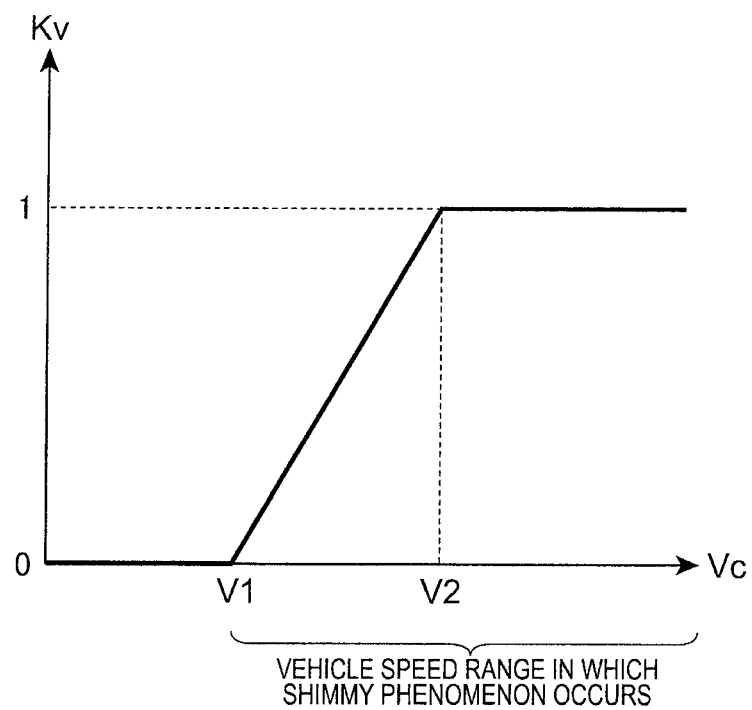
FIG. 10 is a schematic control map illustrating a correlation between vehicle speed and a correction coefficient.

FIG. 10 is a schematic control map illustrating a correlation between the vehicle speed Vc and the vehicle speed correction coefficient Kv.

The vehicle speed correction coefficient setting unit 273 sets the vehicle speed correction coefficient Kv according to the vehicle speed Vc. The control map exemplarily illustrating the correlation between the vehicle speed Vc and the vehicle speed correction coefficient Kv in FIG. 10 is prepared based on an approximation, and stored in the ROM in advance. The vehicle speed correction coefficient setting unit 273 calculates the vehicle speed correction coefficient Kv by substituting the vehicle speed Vc into this control map, and sets the calculated value as the vehicle speed correction coefficient Kv.

In the control map exemplarily illustrated in FIG. 10, when the vehicle speed Vc is lower than or equal to a predetermined lower-limit vehicle speed V1, the vehicle speed correction coefficient Kv is set to zero, and when the vehicle speed Vc is higher than or equal to a predetermined upper-limit vehicle speed V2, the vehicle speed correction coefficient Kv is set to one. When the vehicle speed Vc is higher than the lower-limit vehicle speed V1 and is lower than the upper-limit vehicle speed V2, the vehicle speed correction coefficient Kv is set to be increased from zero to one along with an increase in the vehicle speed Vc. It is possible to exemplify a case in which a vehicle speed higher than the lower-limit vehicle speed V1 is a vehicle speed range in which the shimmy phenomenon is deemed to occur. It is possible to exemplify a case in which the upper-limit vehicle speed V2 is present within the vehicle speed range in which the shimmy phenomenon is deemed to occur.

The vehicle speed correction coefficient multiplying unit 274 calculates a corrected torque change amount by multiplying the torque change amount having a reverse phase with respect to the detected torque T (extracted by the shimmy period extracting unit 271) by the vehicle speed correction coefficient Kv set by the vehicle speed correction coefficient setting unit 273. That is, the vehicle speed correction coefficient multiplying unit 274 corrects the torque change amount based on the vehicle speed Vc.

As such, the vehicle speed correction coefficient setting unit 273 and the vehicle speed correction coefficient multiplying unit 274 serve as an example of the corrector configured to correct the change amount, which has a reverse phase with respect to the detected torque T after passing through the band-pass filter 271a, based on the vehicle speed Vc.

The base shimmy compensation current calculator 275 calculates the base shimmy compensation current Irb based on the corrected torque change amount calculated by the vehicle speed correction coefficient multiplying unit 274.

Figure 11:
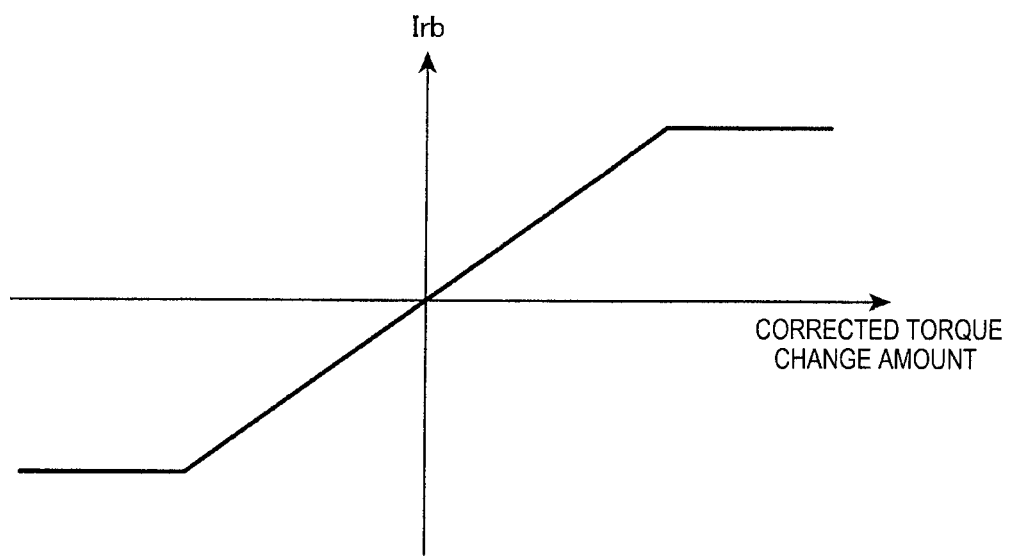
FIG. 11 is a schematic control map illustrating a correlation between a torque change amount after correction and a shimmy compensation current.

FIG. 11 is a schematic control map illustrating a correction between the corrected torque change amount and the base shimmy compensation current Irb. The control map exemplarily illustrating the correlation between the corrected torque change amount and the base shimmy compensation current Irb in FIG. 11 is prepared based on an approximation, and stored in the ROM in advance. The base shimmy compensation current calculator 275 calculates the base shimmy compensation current Irb by reading the corrected torque change amount every predetermined time interval (for example, 4 milliseconds), and substituting the corrected torque change amount, which is read, into this control map. As such, the base shimmy compensation current calculator 275 serves as an example of the base suppression current calculator configured to calculate a base suppression current, which is a base for a suppression current required to suppress a disturbance torque transmitted from the front wheels 150 to the steering wheel 101, based on the change amount having a reverse phase with respect to the detected torque T after passing through the band-pass filter 271a.

The absolute value calculator 276 calculates the absolute value of the extracted torque Te having a positive or negative sign. The value calculated by the absolute value calculator 276 is the extracted absolute torque |Te|.

The averaging unit 277 averages the values of the extracted absolute torque |Te| for a current routine to an n-th preceding routine which are obtained from calculation repeatedly performed by the absolute value calculator 276 every predetermined time interval. The value obtained from averaging performed by the averaging unit 277 is the average torque Ta. An FIR filter may be exemplified as the averaging unit 277. For example, N may be 100.

Figure 12:
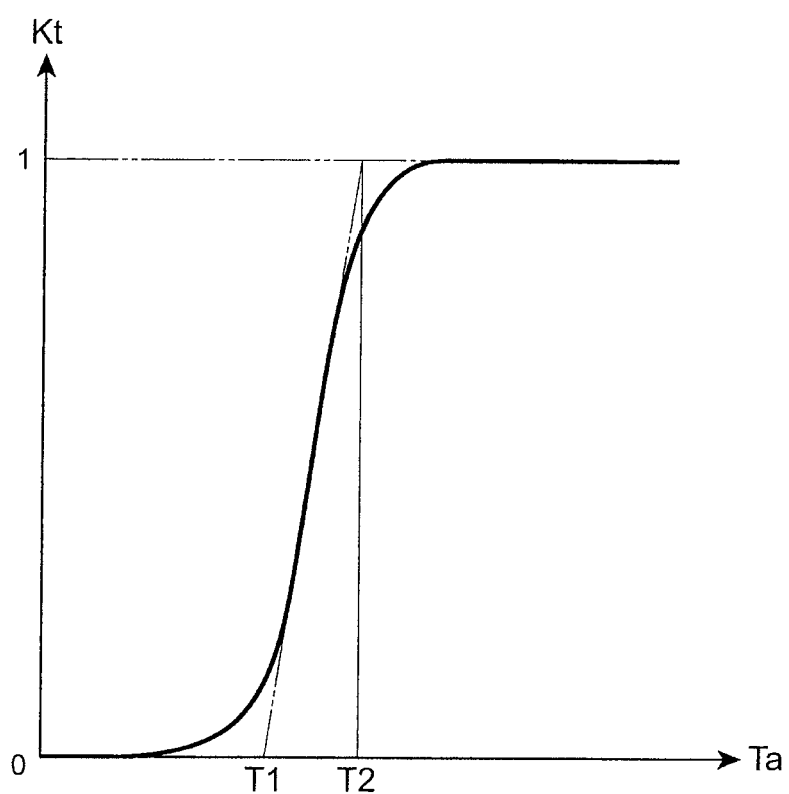
FIG. 12 is a schematic control map illustrating a correlation between an average torque and a torque correction coefficient.

FIG. 12 is a schematic control map illustrating a correlation between the average torque Ta and the torque correction coefficient Kt.

The torque correction coefficient setting unit 278 sets the torque correction coefficient Kt according to the average torque Ta which is a value obtained from averaging performed by the averaging unit 277. For example, the control map exemplarily illustrating the correlation between the average torque Ta and the torque correction coefficient Kt in FIG. 12 is prepared based on an approximation, and stored in the ROM in advance. The torque correction coefficient setting unit 278 calculates the torque correction coefficient Kt by substituting the average torque Ta into this control map, and sets the calculated value as the torque correction coefficient Kt.

In the control map exemplarily illustrated in FIG. 12, when the average torque Ta is less than a predetermined lower-limit torque T1, the torque correction coefficient Kt is set to substantially zero, and when the average torque Ta is greater than a predetermined upper-limit torque T2, the torque correction coefficient Kt is set to substantially one. The torque correction coefficient Kt is set to be gradually increased from zero to one in the range of the average torque Ta which is greater than the lower-limit torque T1 and is less than the upper-limit torque T2. The reason for this is that magnitude of amplitude of torque vibration caused by the shimmy phenomenon is deemed to be considerably greater than magnitude of amplitude of torque vibration caused by factors other than the shimmy phenomenon in a frequency bandwidth in which the shimmy phenomenon is deemed to occur. The torque correction coefficient Kt is set in this manner to set the shimmy compensation current Ir to zero to the extent that torque vibration deemed to be caused by factors other than the shimmy phenomenon is suppressed. As illustrated in FIG. 12, when the average torque Ta is present in the vicinity of the lower-limit torque T1, the torque correction coefficient Kt is set to be gradually increased from zero along with an increase in the average torque Ta. When the average torque Ta is present in the vicinity of the upper-limit torque T2, the torque correction coefficient Kt is set to be gradually decreased from one along with a decrease in the average torque Ta.

The shimmy compensation current calculator 279 calculates the shimmy compensation current Ir by multiplying the base shimmy compensation current Irb (calculated by the base shimmy compensation current calculator 275) by the torque correction coefficient Kt set by the torque correction coefficient setting unit 278 (Ir=Irb×Kt).

As such, the shimmy compensation current calculator 279 serves as an example of the suppression current calculator configured to calculate the shimmy compensation current Ir as an example of a suppression current by correcting the base shimmy compensation current Irb according to the magnitude of amplitude of the extracted torque Te. The shimmy compensation current calculator 279 performs correction such that the shimmy compensation current Ir is set to be lower when the magnitude of amplitude of the extracted torque Te is less than a predetermined value compared to when the magnitude of the amplitude is greater than the predetermined value. For example, when the magnitude is the predetermined value, an average value of an Nth number of extracted absolute torques |Te| (the absolute value of the extracted torque Te) may be the upper-limit torque T2.

The shimmy compensation current setting unit 27 stores the shimmy compensation current Ir calculated by the aforementioned technique in a storage region such as a RAM.

The final target current determination unit 28 adds the shimmy compensation current Ir to the provisional target current Itf stored in the storage region such as a RAM, and determines the calculated value as the target current It.

In the steering apparatus 100 with the aforementioned configuration, the target current It contains the shimmy compensation current Ir which is a current required by the electric motor 110 to cancel vibration that is transmitted to the steering wheel 101 due to the shimmy phenomenon. Therefore, it is possible to suppress the transmission of vibration caused by the shimmy phenomenon to a driver.

The target current calculator 20 with the aforementioned configuration always determines the current, which is obtained by adding the shimmy compensation current Ir to the provisional target current Itf, as the target current It. For this reason, when a large magnitude of vibration caused by the shimmy phenomenon does not occur, the shimmy compensation current Ir is desirably set to zero. In the embodiment, the band-pass filter 271a of the shimmy compensation current setting unit 27 allows the passing through of only signals within the predetermined frequency bandwidth centered around the center frequency Frc, and does not allow the passing through of signals having other frequencies according to the vehicle speed Vc in which vibration caused by the shimmy phenomenon is deemed to occur. For this reason, compared to when the center frequency Frc is not changed according to the vehicle speed Vc, and signals having the frequency of vibration caused by the shimmy phenomenon are extracted by a filter that allows the passing through of signals within a frequency bandwidth (for example, 10 Hz to 20 Hz) covering all vehicle types or vehicle options, the shimmy compensation current setting unit 27 in the embodiment is capable of suppressing the application of the shimmy compensation current Ir when vibration caused by the shimmy phenomenon does not occur.

Since vibration caused by the shimmy phenomenon is deemed to occur when the vehicle speed Vc is in a specific speed range, in the control map exemplarily illustrated in FIG. 10, the vehicle speed correction coefficient Kv is set to zero when the vehicle speed vc is lower than a vehicle speed range in which vibration caused by the shimmy phenomenon is deemed to occur. Accordingly, the shimmy compensation current Ir is set to zero when vibration caused by the shimmy phenomenon does not occur. Therefore, the existence of the shimmy compensation current Ir in the target current It even if vibration caused by the shimmy phenomenon does not occur can be suppressed.

As a result, it is possible to suppress deterioration of steering feeling when vibration caused by the shimmy phenomenon does not occur.

The base shimmy compensation current Irb calculated by the base shimmy compensation current calculator 275 of the shimmy compensation current setting unit 27 is a value based on the torque change amount having a reverse phase with respect to the extracted torque Te computed by the torque change amount calculator 272. As illustrated in FIGS. 4 and 11, when the detected torque T detected by the torque sensor 109 has a reverse phase (reverse sign (when one has a positive sign, the other has a negative sign)) with respect to the torque change amount, the base current Ib has a reverse sign (when one has a positive sign, the other has a negative sign)) with respect to the base shimmy compensation current Irb. For this reason, the shimmy compensation current setting unit 27 is capable of highly precisely calculating the current required by the electric motor 110 to cancel vibration that is transmitted to a driver due to the shimmy phenomenon.

Since the magnitude of amplitude of torque vibration caused by the shimmy phenomenon is deemed to be greater than a specific magnitude, in the control map exemplarily in FIG. 12, the torque correction coefficient Kt is set to be less than one when the average torque Ta is less than the magnitude of amplitude of torque vibration caused by the shimmy phenomenon. Accordingly, the existence of the shimmy compensation current Ir (to the extent that torque vibration passing through the band-pass filter 271a is cancelled) in the target current It even if torque vibration is caused by factors other than the shimmy phenomenon can be suppressed.

Figure 13A:
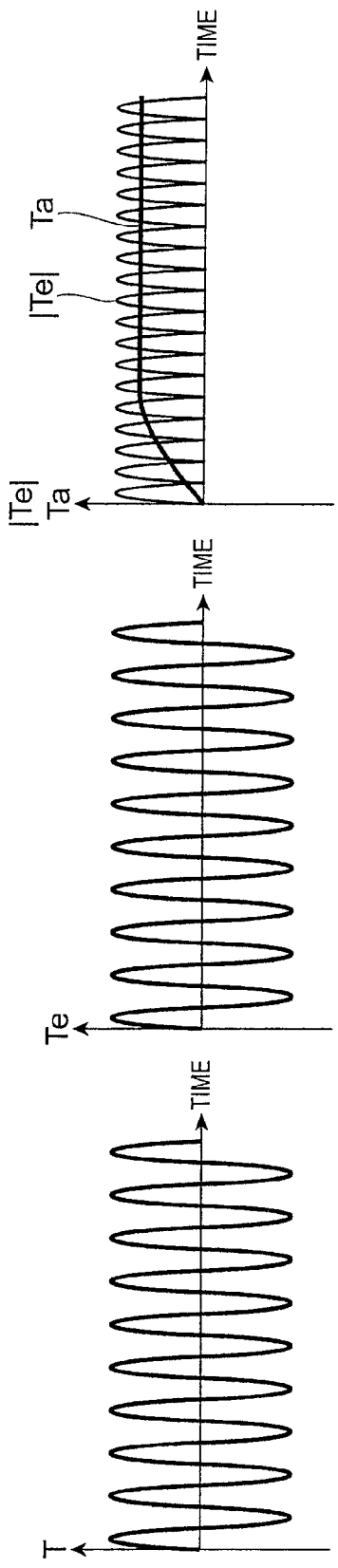
FIGS. 13A, 13B and 13C are graphs illustrating the detected torque, an extracted torque, an extracted absolute torque, and the average torque when torque vibration caused by the shimmy phenomenon is input.
Figure 13B:
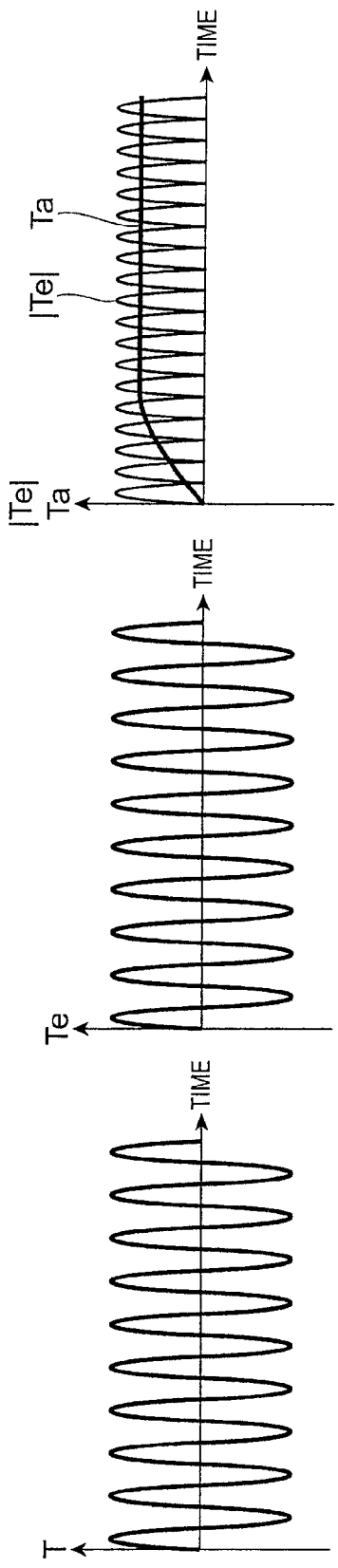
Figure 13C:
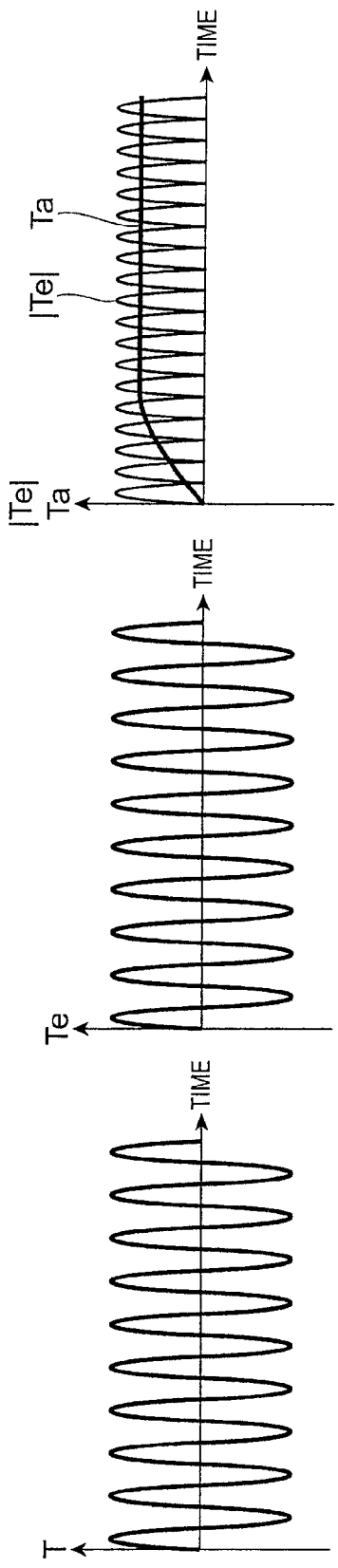
Figure 13D:
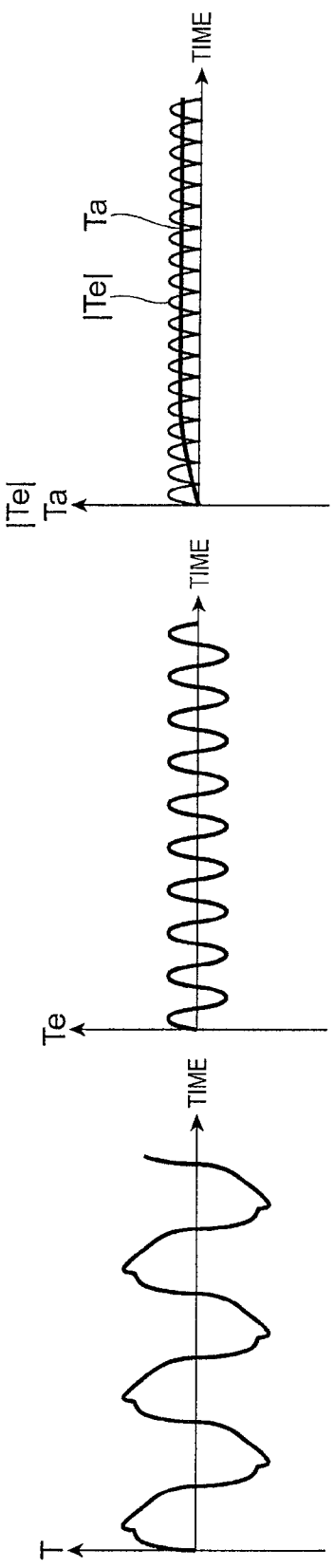
FIGS. 13D, 13E and 13F are graphs illustrating the detected torque, the extracted torque, the extracted absolute torque, and the average torque when torque vibration is input due to factors other than the shimmy phenomenon.
Figure 13E:
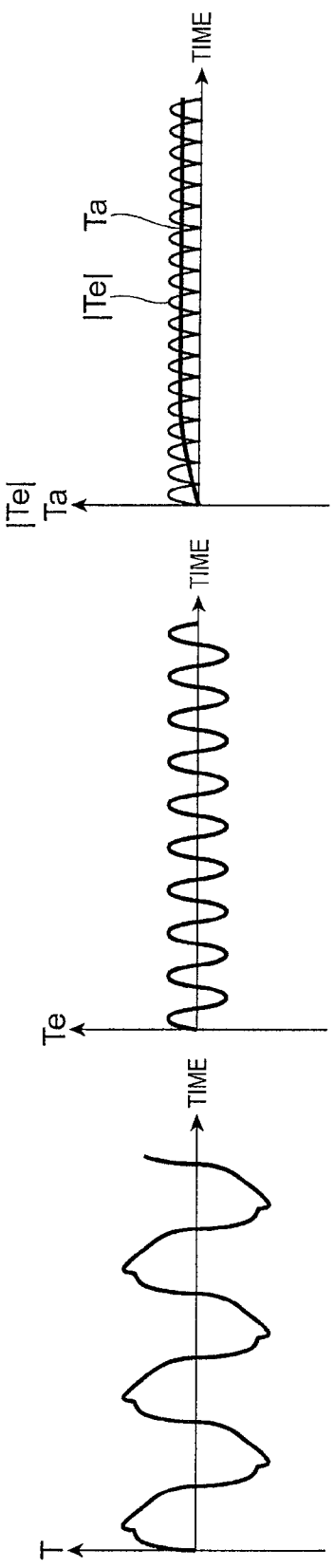
Figure 13F:
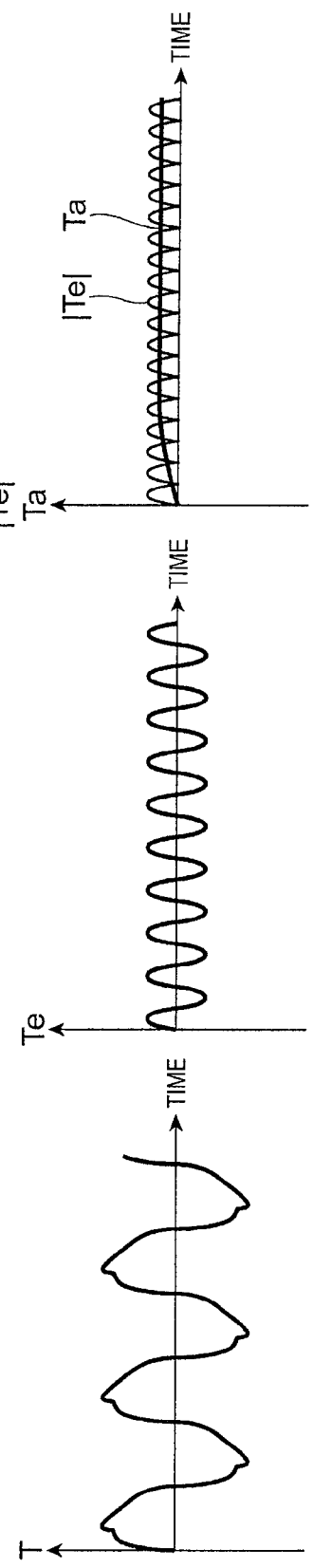

FIGS. 13A to 13C are graphs illustrating the detected torque T, the extracted torque Te, the extracted absolute torque |Te|, and the average torque Ta when torque vibration caused by the shimmy phenomenon is input. FIGS. 13D to 13F are graphs illustrating the detected torque T, the extracted torque Te, the extracted absolute torque |Te|, and the average torque Ta when torque vibration caused by factors other than the shimmy phenomenon is input.

When torque vibration caused by the shimmy phenomenon is input, the detected torque T detected by the torque sensor 109 fluctuates as illustrated in FIG. 13A, and the extracted torque Te after passing through the band-pass filter 271a fluctuates as illustrated in FIG. 13B. Since the frequency of the detected torque T is a frequency that passes through the band-pass filter 271a when the input torque vibration is caused by the shimmy phenomenon, the detected torque T is the same as the extracted torque Te. The extracted absolute torque |Te|, which is the absolute value of the extracted torque Te, fluctuates as illustrated by the thin solid line in FIG. 13C, and the average torque Ta, which is obtained by averaging the extracted absolute torque |Te| fluctuates as illustrated by the bold solid line in FIG. 13C. Since the average torque Ta is calculated as a value greater than the upper-limit torque T2 when the input torque vibration is caused by the shimmy phenomenon, the torque correction coefficient setting unit 278 sets the torque correction coefficient Kt to one. For this reason, the shimmy compensation current Ir calculated by the shimmy compensation current calculator 279 has the same value as the base shimmy compensation current Irb calculated by the base shimmy compensation current calculator 275 (Ir=Irb).

In contrast, torque vibration caused by factors other than the shimmy phenomenon is deemed to be input, for example, torque vibration of the detected torque T detected by the torque sensor 109 is deemed to be input while fluctuating as illustrated in FIG. 13D. When a portion of the torque vibration caused by factors other than the shimmy phenomenon has frequency components passing through the band-pass filter 271a, the extracted torque Te extracted by the shimmy period extracting unit 271 fluctuates as illustrated in FIG. 13E. The extracted absolute torque |Te|, which is the absolute value of the extracted torque Te, fluctuates as illustrated by the thin solid line in FIG. 13F, and the average torque Ta, which is obtained by averaging the extracted absolute torque |Te| fluctuates as illustrated by the bold solid line in FIG. 13F. Since the average torque Ta is principally calculated as a value less than the lower-limit torque T1 when the input torque vibration is caused by factors other than the shimmy phenomenon, the torque correction coefficient setting unit 278 principally sets the torque correction coefficient Kt to zero. For this reason, the shimmy compensation current Ir calculated by the shimmy compensation current calculator 279 is principally zero (Ir=Irb×0=0).

As described above, according to the shimmy compensation current setting unit 27 in the embodiment, the existence of the shimmy compensation current Ir (required to cancel torque vibration passing through the band-pass filter 271*a*) in the target current It even if torque vibration caused by the shimmy phenomenon does not occur can be suppressed.

As a result, it is possible to suppress deterioration of steering feeling when vibration caused by the shimmy phenomenon does not occur.

In the embodiment, a sensor basically detecting the amount of twist of the torsion bar 112 is used as the torque sensor 109 that detects a steering torque applied to the steering wheel 101 and a disturbance torque transmitted to the pinion shaft 106 via the front wheels 150; however, the present invention is not limited to this configuration in the embodiment. For example, a magnetostrictive sensor, which detects a torque based on a change in magnetic characteristics caused by magnetostriction, may be adopted.

In the embodiment, control of suppressing vibration caused by the shimmy phenomenon is applied to a pinion type motor-driven power steering apparatus; however, the application of this control is not limited to a pinion type motor-driven power steering apparatus. This control may be applied to other types of motor-driven power steering apparatuses such as a double pinion type motor-driven power steering apparatus and a rack assist type motor-driven power steering apparatus.

What is claimed is:

1. A motor-driven power steering apparatus comprising:
   a steering shaft configured to be rotated in connection with a steering wheel of a vehicle;
   a pinion shaft configured to apply driving force to a rack shaft by rotating with respect to the rack shaft turning a turning wheel;
   a detector configured to detect a torque between the steering shaft and the pinion shaft;
   an electric motor configured to apply driving force to the rack shaft;
   a base current calculator configured to calculate a base current, which is a base for a target current to be supplied to the electric motor, based on a detected torque detected by the detector;
   a band-pass filter configured to allow a predetermined range of frequency components of the detected torque detected by the detector to pass through the band-pass filter;
   a base suppression current calculator configured to calculate a base suppression current, which is a base for a suppression current required to suppress a disturbance torque transmitted from the turning wheel to the steering wheel, based on a passing torque which is the detected torque after passing through the band-pass filter;
   a suppression current calculator configured to calculate the suppression current by correcting the base suppression current, which is calculated by the base suppression current calculator, according to magnitude of amplitude of the passing torque; and
   a target current determiner configured to determine the target current based on the base current calculated by the base current calculator and the suppression current calculated by the suppression current calculator.

2. The motor-driven power steering apparatus according to claim 1,
   wherein the suppression current calculator performs the correcting such that the suppression current is set to be lower when the magnitude of amplitude of the passing torque is less than a predetermined value compared to when the magnitude of the amplitude is greater than the predetermined value.

3. The motor-driven power steering apparatus according to claim 1,
   wherein the base suppression current calculator calculates the base suppression current based on a change amount having a reverse phase with respect to the passing torque.

4. The motor-driven power steering apparatus according to claim 2,
   wherein the base suppression current calculator calculates the base suppression current based on a change amount having a reverse phase with respect to the passing torque.

5. The motor-driven power steering apparatus according to claim 1,
   wherein the band-pass filter is a filter that allows the passing through of the predetermined range of frequency components centered around a center frequency,
   wherein the motor-driven power steering apparatus further comprises:
   a changer configured to change the center frequency based on a vehicle speed which is a moving speed of the vehicle.

6. The motor-driven power steering apparatus according to claim 2,
   wherein the band-pass filter is a filter that allows the passing through of the predetermined range of frequency components centered around a center frequency,
   wherein the motor-driven power steering apparatus further comprises:
   a changer configured to change the center frequency based on a vehicle speed which is a moving speed of the vehicle.

7. The motor-driven power steering apparatus according to claim 3,
   wherein the band-pass filter is a filter that allows the passing through of the predetermined range of frequency components centered around a center frequency,
   wherein the motor-driven power steering apparatus further comprises:
   a changer configured to change the center frequency based on a vehicle speed which is a moving speed of the vehicle.

8. The motor-driven power steering apparatus according to claim 4,
   wherein the band-pass filter is a filter that allows the passing through of the predetermined range of frequency components centered around a center frequency,
   wherein the motor-driven power steering apparatus further comprises:
   a changer configured to change the center frequency based on a vehicle speed which is a moving speed of the vehicle.

9. The motor-driven power steering apparatus according to claim 1, the apparatus further comprising:

a corrector configured to correct a change amount having a reverse phase with respect to the passing torque based on a vehicle speed which is a moving speed of the vehicle, wherein the base suppression current calculator calculates the base suppression current based on the change amount corrected by the corrector.

\* \* \* \* \*